United States Patent [19]
Sumihiro et al.

[11] Patent Number: 5,099,467
[45] Date of Patent: Mar. 24, 1992

[54] DISK-SHAPED RECORDING MEDIUM AND APPARATUS FOR RECORDING AND/OR REPRODUCING DATA THEREON

[75] Inventors: Hiroshi Sumihiro, Kanagawa; Masataka Ogawa, Chiba, both of Japan

[73] Assignee: Sony Corporation, Tokyo, Japan

[21] Appl. No.: 431,195

[22] Filed: Nov. 3, 1989

[30] Foreign Application Priority Data

Nov. 10, 1988 [JP] Japan ................... 63-282556

[51] Int. Cl.⁵ .................................. G11B 7/00
[52] U.S. Cl. ........................ 369/44.26; 369/44.34; 369/44.28; 369/48; 369/50; 369/275.3
[58] Field of Search ............... 369/44.26, 44.28, 44.34, 369/32, 275.3

[56] References Cited

U.S. PATENT DOCUMENTS

| | | | |
|---|---|---|---|
| 4,443,870 | 4/1984 | Hazel et al. | 369/44.26 |
| 4,562,564 | 12/1985 | Bricot et al. | 369/44.26 |
| 4,663,751 | 5/1987 | Kaku et al. | 369/44.26 |
| 4,748,609 | 5/1988 | Yonezawa et al. | 369/44.26 |
| 4,912,311 | 3/1990 | Hasegawa et al. | 369/275.3 |
| 4,920,462 | 4/1990 | Couse et al. | 369/32 |
| 4,949,331 | 8/1990 | Maeda et al. | 369/275.3 |
| 4,967,403 | 10/1990 | Ogawa et al. | 369/44.26 |
| 4,984,901 | 1/1991 | Maury | 369/44.26 |

*Primary Examiner*—Donald McElheny, Jr.
*Attorney, Agent, or Firm*—Alvin Sinderbrand; William S. Fromer

[57] ABSTRACT

A disk-shaped recording medium has a control record region in each recording region of successive recording tracks and which is divided into a first preformat region, a second preformat region and a focusing servo region arranged in succession in the direction along the respective track and respectively providing traverse data, tracking and clock data, and focusing servo data. An apparatus for reproducing data recorded in the tracks of such disk-shaped recording medium samples a playback output from an optical head scanning a track to detect focusing data from the focusing servo region and tracking data from the second preformat region and, in response thereto, applies focusing servo or tracking servo to the optical head. Further, traverse data is detected in the first preformat region to effect traverse counting of the recording tracks.

8 Claims, 6 Drawing Sheets

DISK-SHAPED RECORDING MEDIUM AND APPARATUS FOR RECORDING AND/OR REPRODUCING DATA THEREON

BACKGROUND OF THE INVENTION

1. Field of the Invention

This invention relates to a disk-shaped recording medium, such as, a magneto-optical disk, and an apparatus for recording and/or reproducing data on such recording medium. More particularly, the invention relates to a disk-shaped recording medium on which servo signals are recorded by discrete preformatting and to an apparatus in which a sampled servo technique is utilized for recording and/or reproducing data on the disk-shaped recording medium.

2. Description Of The Prior Art

There has recently been developed and marketed disk-shaped recording media with which optical or magneto-optical signal recording and/or reproducing methods are employed. Examples of known types of disk-shaped recording media include a read-only memory (ROM) type recording medium, such as, a compact disk (CD), a write-once type recording medium on which data can be written only once by the user, and a recording medium on which data can be rewritten, that is, overwritten, such as, a magneto-optical disk. As one of the techniques for realizing a unified recording format for these various recording media, it has been proposed to use a so-called sampled servo technique in which, in a manner similar to that used in the so-called sector servo in the case of hard magnetic disks, servo signals are pre-formatted at intervals of a predetermined distance or angle on concentric circular tracks or on successive tracks forming turns of a spiral, and such discrete servo signals are sampled and held during disk driving to perform continuous servo control.

This type of disk-shaped recording medium has been proposed, for example, as disclosed in the co-pending U.S. Pat. Application Ser. No. 07/348,486, filed on Apr. 18, 1989, now U.S. Pat. No. 4,925,717 and having a common assignee herewith, in the form of an optical disk d having the recording format shown in FIG. 1. The optical disk is shown to include an annular label section 2 extending around a center aperture 1 and an annular recording surface 3 surrounding the label section 2. On this recording surface 3, there are provided recording tracks tk which are concentric with the center aperture 1, or which are constituted by successive turns of a continuous spiral centered at the aperture 1. Each of the tracks tk is divided into a predetermined number of sectors $SC_1$ to $SC_m$. A plurality of sectors bearing the same suffix numerals in the several tracks tk, such as the sectors $SC_1$, are arranged in radial alignment with each other on the optical disk d. Each of the sectors $SC_1$ to $SC_m$ of each of the tracks includes a predetermined number n of blocks $BL_1$ to $BL_n$, arranged along the respective track tk, with the incipient block $BL_1$ of each sector being an address data division AD. In respect to these blocks $BL_1$ to $BL_n$, it will be seen that a plurality of blocks bearing the same suffix number, such as, the blocks $BL_1$ of the sectors $SC_1$ to $SC_m$, respectively, are arranged in radial alignment with correspondingly identified blocks $BL_1$, in the other tracks on the optical disk d. Each of the blocks $BL_1$ to $BL_n$ in each of these sectors $SC_1$ to $SC_m$ has a control record region $AR_c$ at its leading or incipient side, followed by a data write region $AR_D$.

The control record region $AR_c$ of each of the blocks $BL_1$ to $BL_n$ is divided into a servo region $AR_S$ and a traverse region $AR_T$. In the servo region $AR_S$, a pair of tracking data pits $Q_A$ and $Q_C$ are arrayed so as to be offset, at opposite sides, in respect to a track centerline $K_c$ and are spaced, at a predetermined interval, for example, an interval of eight channel bits, along the track direction. A clock data pit $Q_B$ is arranged between these track data pits $Q_A$ and $Q_C$ and is located on the track centerline $K_C$. In the traverse region $AR_T$, a pair of traverse data pits $Q_D$ and $Q_E$ are arrayed at a distance P from each other, and such distance P is allotted for each recording track tk with the clock data pit $Q_B$ as the reference.

Each control record region $AR_C$ has a data recording capacity of 30 channel bits. Among these 30 channel bits, the 7th and the 15th channel bits are allotted as the recording positions of the tracking data pits $Q_A$ and $Q_C$, the 11th channel bit is allotted as the recording position for the clock data pit $Q_B$ and the 19th to 27th channel bits are allotted as the recording area for the traverse data pits $Q_D$ and $Q_E$.

In an optical disk recording and/or reproducing apparatus employing the above described optical disk d as the disk-shaped recording medium therefor, channel clocks may be reproduced from the clock data pits $Q_B$ while tracking control is effected on the basis of the tracking data pits $Q_A$ and $Q_C$ provided in the servo region $AR_S$ of the control record region $AR_C$ of each of the blocks $BL_1$ to $BL_n$ preformatted on the optical disk d. On the other hand, the pit pattern of the traverse data pits $Q_D$ and $Q_E$ may be read from the traverse region $AR_T$ on the basis of the playback clocks to perform traverse counting of the recording tracks on a track-by-track basis.

However, the above described optical disk d is disadvantageous in that, since the traverse region $AR_1$ and the servo region $AR_S$ are provided in the trailing half and the leading half, respectively, of the control record region $AR_C$, it is necessary to read the tracking data pits $Q_A$ and $Q_C$ of the servo region $AR_S$ and the clock data pits $Q_B$, in the vicinity of the points at which switching occurs from the writing scanning for the data write region $AR_D$ to the read-out scanning for the control record region $AR_C$ in the course of a recording operation during which the data write scanning for the data write region $AR_D$ and the servo data read-out scanning for the control record region $AR_C$ are repeated alternately, so that stable servo controlling cannot be achieved.

OBJECTS AND SUMMARY OF THE INVENTION

Accordingly, it is an object of the present invention to provide a disk-shaped recording medium and an apparatus for recording and/or reproducing data thereon which avoid the above discussed problems.

More specifically, it is an object of the present invention to provide a disk-shaped recording medium and an apparatus for recording and/or reproducing data thereon which are arranged so that stable sampled servo controlling of the disk-shaped recording medium can be realized.

It is another object of the present invention to provide a disk-shaped recording medium and a recording and/or reproducing apparatus therefor in which traverse counting of the recording tracks of the disk-shaped recording medium can be reliably achieved.

In accordance with an aspect of this invention, in a disk-shaped recording medium having a large number of recording tracks which are concentrically circular, or in the form of successive turns of a spiral, on an annular recording surface surrounding a center aperture, and in which each recording track includes a predetermined number of recording regions in radial alignment with corresponding recording regions in the other tracks, with each recording region including a control record region followed by a data write region: the control record region is divided into a first preformat region, a second preformat region and a focusing servo region, the first preformat region is disposed at the upstream or incipient side of the control record region and has at least one traverse data pit arrayed on a track centerline and allotted for the respective one of the recording tracks; the second preformat region is disposed adjacent to the first preformat region and has a pair of tracking data pits spaced apart from each other a predetermined distance and arranged on radially inner and outer sides of the track centerline, and a clock data pit arranged on the track centerline; and the focusing servo region has a mirror-like surface and follows the second preformat region.

In accordance with another aspect of this invention, an apparatus for recording and/or reproducing data on the aforesaid disk-shaped recording medium comprises an optical head optically scanning the recording tracks on the disk-shaped recording medium, timing generating means for generating timing clocks on the basis of clock data indicated by the clock data pits included in the playback output of the optical head, and head servo means for sampling the playback output from the optical head by the timing clocks so as to detect focusing data from the focusing servo region and tracking data indicated by the tracking data pits from the second preformat region for use in applying focusing servo and tracking servo to the optical head.

The above, and other objects, features and advantages of the invention, will become apparent from the following detailed description which is to be read in conjunction with the accompanying drawings in which corresponding elements are identified by the same reference letters and numerals in the several views.

DESCRIPTION OF PREFERRED EMBODIMENTS

Figure 1:
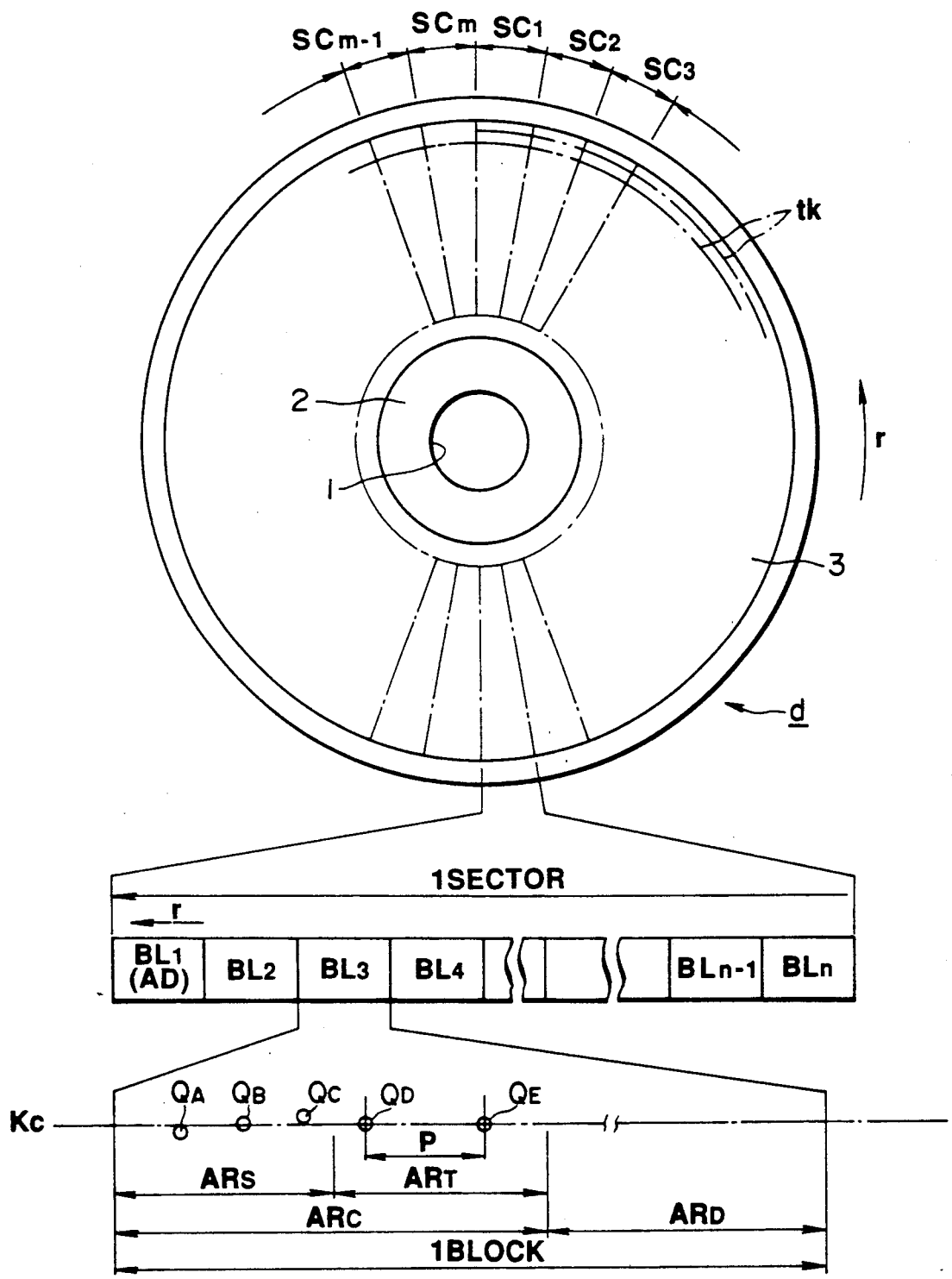
FIG. 1 is a diagrammatic view showing a recording format of a conventional optical recording disk.
Figure 2:
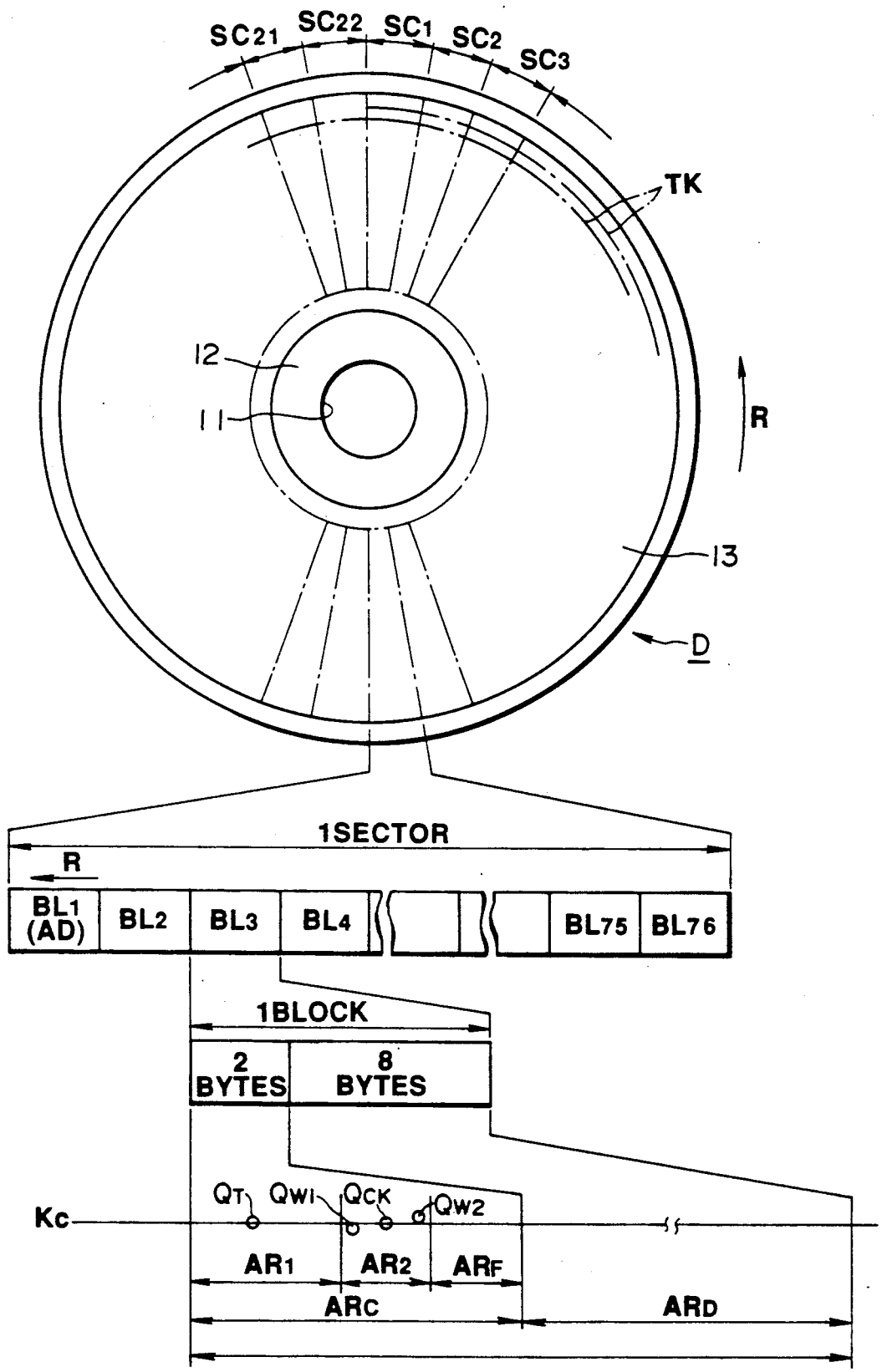
FIG. 2 is a diagrammatic view similar to that of FIG. 1, but showing an example of the recording format of an optical recording disk according to an embodiment of the present invention.

Referring in detail to FIG. 2, it will be see that an optical recording disk D according to an embodiment of the present invention includes, similarly to the conventional optical disk d described with reference to FIG. 1, an annular label section 12 extending around a center aperture 11 and an annular recording surface 13 surrounding the label section 12. The recording surface 13 is provided with a number of recording tracks TK which are circularly concentric with the center aperture 11 or which are constituted by successive turns of a continuous spiral centered at the aperture 11.

Each of the tracks TK is shown to be divided into 22 sectors $SC_1$ to $SC_{22}$. The sectors bearing the same suffix numbers in the several tracks, such as the sectors $SC_1$, are radially aligned with each other, that is, are arranged along the same radial line on the disk D. Each of the sectors $SC_1$ to $SC_{22}$ in each of the tracks TK includes 76 blocks $BL_1$ to $BL_{76}$, arranged in succession along the respective recording track TK, with each leading end or incipient block $BL_1$ constituting an address data division AD. In respect to these blocks $BL_1$ to $BL_{76}$, it will be seen that a plurality of blocks bearing the same suffix number, such as, blocks $BL_1$ of the sectors $SC_1$ to $SC_{22}$, respectively, are radially aligned with correspondingly identified blocks $BL_1$ in the sectors $SC_1$ to $SC_{22}$ of the other tracks TK on the disk D. Each of the blocks $BL_1$ to $BL_{76}$ in each of the sectors $SC_1$ to $SC_{22}$ has a 2-byte control record region $AR_C$ at the incipient or leading side, followed by an 8-byte data write region $AR_D$.

The control record region $AR_C$ of each of the blocks $BL_1$ to $BL_{76}$ is divided into three regions, that is, a first preformat region $AR_1$, a second preformat region $AR_2$ and a focusing servo region $AR_F$. The first preformat region $AR_1$ is at the upstream or incipient side of the control record region $AR_C$ and a traverse data pit $Q_T$, allotted for each of the different recording tracks, is disposed in the region $AR_1$ on a track centerline $K_C$. In the second preformat region $AR_2$ which follows the first preformat region $AR_1$, a pair of tracking data pits $Q_{W1}$ and $Q_{W2}$ are spaced apart by six channel bits and are arrayed on opposite sides of the track centerline $K_C$, while a clock data pit $Q_{CK}$ is provided between the tracking data pits $Q_{W1}$ and $Q_{W2}$ on the track centerline $K_C$. The focusing servo region $AR_F$ has a mirror-like surface located after the second preformat region $AR_2$.

The optical disk D embodying the present invention is employed for recording and/or reproducing digital data with a modulation system in which the number of channel bits of each one byte (8-bits) is converted into 11 channel bits. Thus, the 2-byte control record region $AR_C$ has a data storage capacity of 22 channel bits.

The traverse data pit $Q_T$, allotted for each of the recording tracks, is provided as a gray code in one of four channel bits, that is, the fourth to seventh channel bits, of the first preformat region $AR_1$.

The tracking data pits $Q_{W1}$ and $Q_{W2}$ are located at channel bits in the second preformat region $AR_2$ spaced from each other by 6 channel bits, for example, are located at the 11th and the 18th channel bits. The clock data pit $QR_{CK}$ is located at the 14th channel bit in the second preformat region $AR_2$. The 19th to 22nd channel bits of the control record region AR_C bear no recordings and represent the aforementioned mirror-like surface of the focus servo region AR_F.

Figure 3:
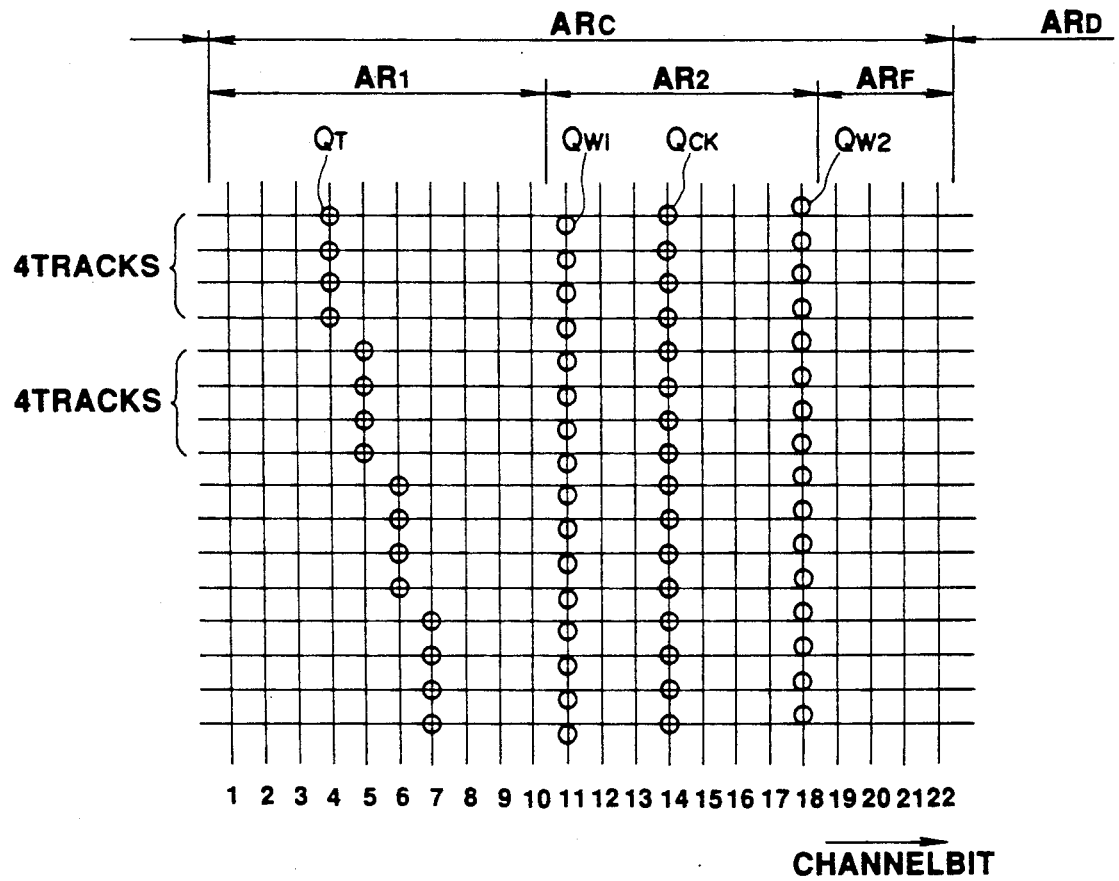
FIG. 3 is a diagrammatic view showing an arrangement of data pits provided in the control record regions of a number of recording tracks on an optical recording disk according to an embodiment of the present invention.

The arrayed state of the traverse data pits $Q_T$, tracking data pits $Q_{H1}$, $Q_{H2}$ and clock data pits $Q_{CK}$ cross the respective track centerlines $K_C$, that is, in the radial direction of the optical disk D, is such that, as shown in FIG. 3, the tracking data pits $Q_{H1}$, $Q_{H2}$ and the clock data pit $Q_{CK}$ in each track are aligned radially along straight lines, with the pits $Q_{H1}$, $Q_{H2}$ and $Q_{CK}$ in the other tracks, whereas the traverse data pits $Q_T$ are in a pattern defined by the pits being offset in the track direction by one channel bit at intervals of four consecutive tracks.

Figure 4:
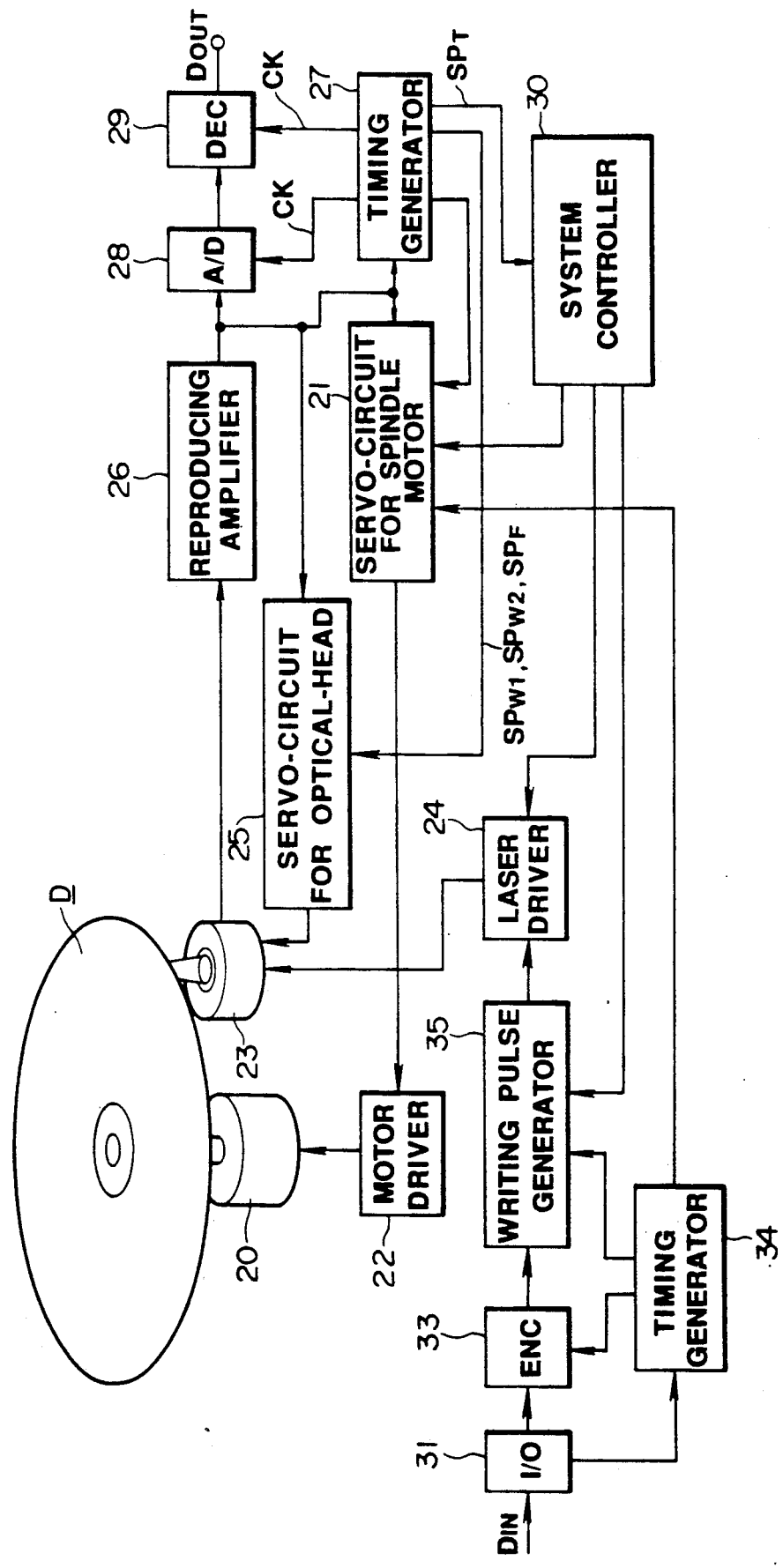
FIG. 4 is a block diagram showing a recording/reproducing apparatus according to an embodiment of the present invention.

Referring now to FIG. 4, it will be seen that, in an optical disk recording/reproducing apparatus for use with the above described optical disk D, a spindle motor 20 for effecting rotation of the optical disk D is driven at a constant angular velocity in response to a control signal supplied from a spindle servo circuit 21 to a motor drive circuit 22.

An optical head 23 is provided for scanning the recording tracks TK of the optical disk D with a laser light beam, and conventionally has a laser diode (not shown) driven by a laser driving circuit 24 to output the laser light beam for data recording and/or reproducing of digital data. The head 23 further conventionally includes a photodetector, also not shown, for detecting the light of the laser beam reflected from the optical disk D. While the optical head 23 performs recording and/or reproducing operations, focus servo and/or track servo controlling thereof are effected by a head servo circuit 25. The output of the photodetector in the optical head 23 is supplied through an amplifier 26 to the spindle servo circuit 21, the head servo circuit 25, a timing generator 27 and an A/D converter 28.

Figure 5:
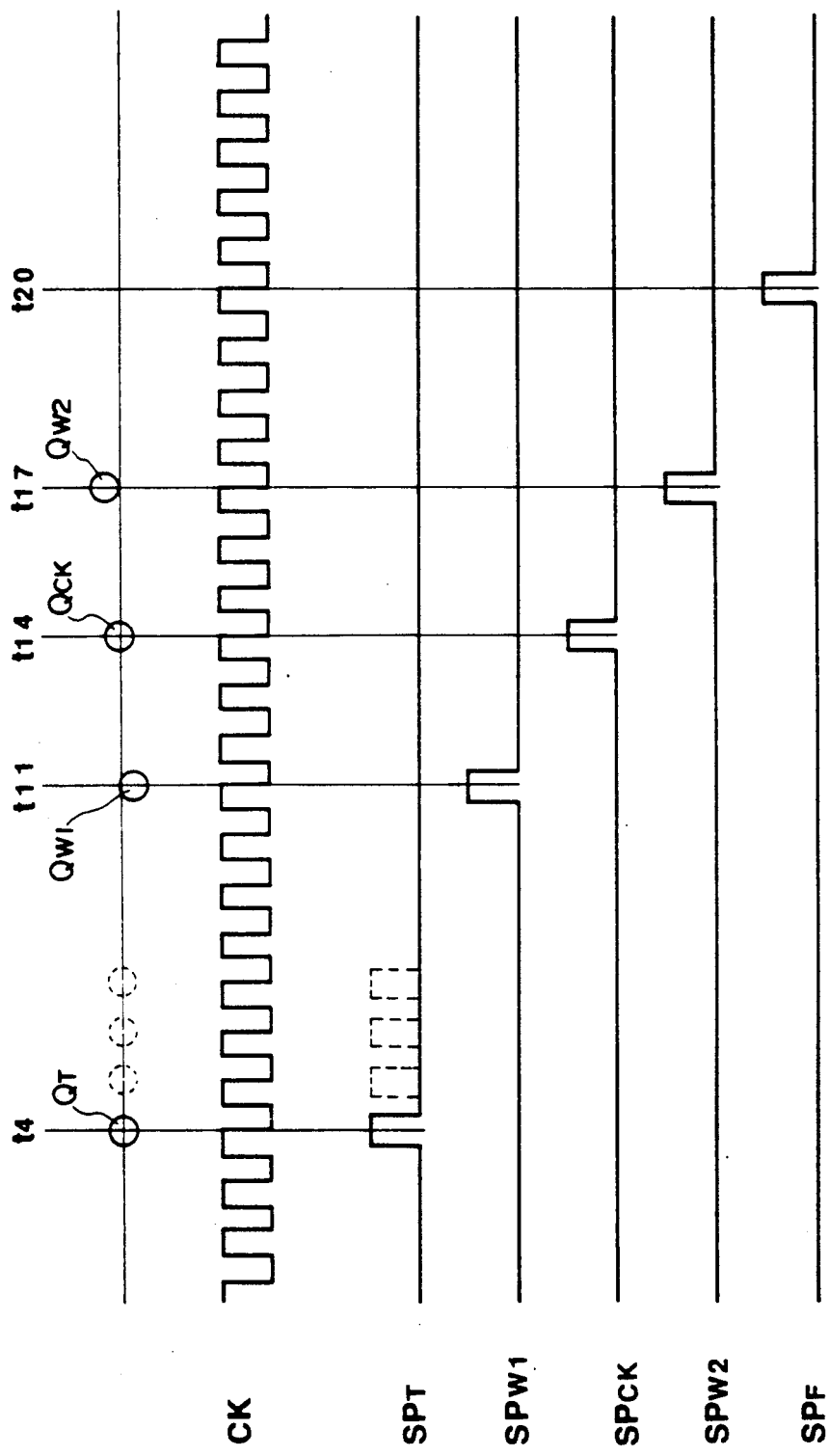
FIG. 5 is a timing chart to which reference will be made in explaining the operation of a clock regenerating circuit included in the recording/reproducing apparatus.
Figure 6:
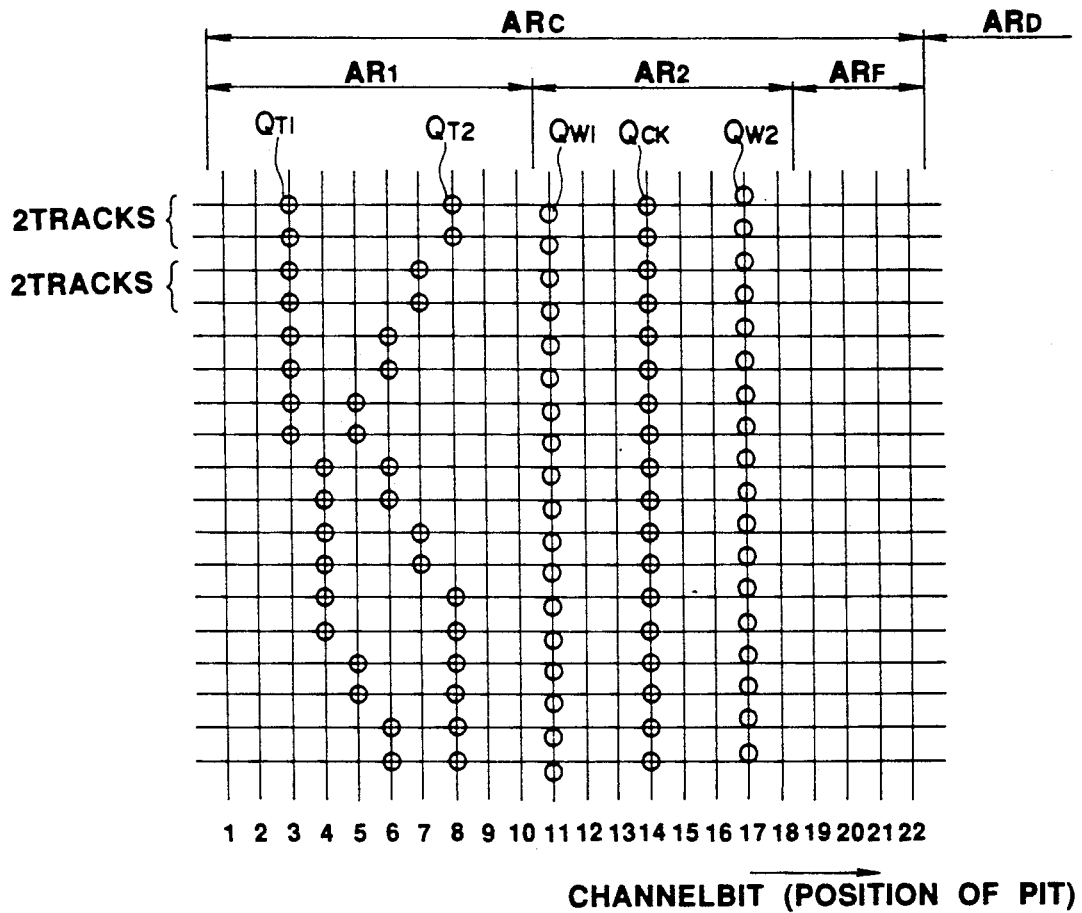
FIG. 6 is a diagrammatic view similar to that of FIG. 3, but showing a modified arrangement of the data pits provided in the control record regions of an optical disk according to another embodiment of the present invention.

The timing generator 27 includes a so-called phase lock loop (PLL) which is not shown, and which is operative in response to the output from the optical head 23 corresponding to the clock data pits $Q_{CK}$ to reproduce channel clocks CK (FIG. 5). The timing generator 27 is also operative to produce various sampling pulses $SP_T$, $SP_{H1}$, $SP_{CK}$, $SP_{H2}$ and $SP_F$ in synchronism with the channel clocks CK during each period corresponding to the control record region $AR_C$ of the record track TK being scanned. The timing generator 27 supplies the channel clocks CK to the A/D converter 28 and to a decoder 29. During a servo data read-out period corresponding to the scanning of the control record region $AR_C$ of the control track TK, the timing generator 27 supplies the sampling pulse $SP_T$ (FIG. 5), at the time $t_4$ corresponding to the fourth channel bit, to a system controller 30 which may be constituted by a microcomputer or the like. Further, the sampling pulses $SP_{H1}$, $SP_{H2}$ and $SP_F$ are supplied from the timing generator 27 to the head servo circuit 25 at the times $t_{11}$, $t_{18}$ and $t_{20}$ corresponding to the 11th, 18th and the 20th channel bits, respectively.

In the recording mode of the described optical disk recording/reproducing apparatus, digital data $D_{In}$ to be recorded are supplied through an input/output interface 31, to an encoder 33, while bit clocks of the digital data $D_{IN}$ are supplied to a timing generator 34.

The timing generator 34 responds to the bit clocks of the digital data $D_{IN}$ generate channel clocks of 11 to channel bits at one bit intervals of the 8-bit digital data $D_{IN}$, and such channel clocks are transmitted, as operational timing clocks, to the encoder 33 and to a write pulse generator 35 which is adapted for generating pulses in accordance with the output of the encoder 33.

The encoder 33 modulates the digital data $D_{IN}$ into 4/11 modulation code data having $_{11}C_4$ in accordance with a 4/11 modulation code wherein each byte composed of eight bits is converted into 11 channel bits having four channel bit marks (logic "1"s) in each bit pattern. Further, the bit pattern (1111) with four consecutive channel bit marks and the bit patterns (111011), (110111) and (1110111) with three or two consecutive channel bit marks and two or three consecutive channel bit marks before and after one channel bit space (logic "0") are excluded, as shown in the below Table 1.

TABLE 1

| digital data $D_{IN}$ | 4/11 Modulation Code Data encoded data channel bits | | | | | | | | | | |
|---|---|---|---|---|---|---|---|---|---|---|---|
| | (1) | (2) | (3) | (4) | (5) | (6) | (7) | (8) | (9) | (10) | (11) |
| 0 0 | 1 | 1 | 0 | 1 | 0 | 0 | 1 | 0 | 0 | 0 | 0 |
| 0 1 | 1 | 1 | 0 | 1 | 0 | 0 | 0 | 1 | 0 | 0 | 0 |
| 0 2 | 1 | 1 | 0 | 1 | 0 | 0 | 0 | 0 | 1 | 0 | 0 |
| 0 3 | 1 | 1 | 0 | 1 | 0 | 0 | 0 | 0 | 0 | 1 | 0 |
| 0 4 | 1 | 1 | 0 | 1 | 0 | 0 | 0 | 0 | 0 | 0 | 1 |
| 0 5 | 1 | 1 | 0 | 0 | 1 | 0 | 1 | 0 | 0 | 0 | 0 |
| 0 6 | 1 | 1 | 0 | 0 | 1 | 0 | 0 | 1 | 0 | 0 | 0 |
| 0 7 | 1 | 1 | 0 | 0 | 1 | 0 | 0 | 0 | 1 | 0 | 0 |
| 0 8 | 1 | 1 | 0 | 0 | 1 | 0 | 0 | 0 | 0 | 1 | 0 |
| 0 9 | 1 | 1 | 0 | 0 | 1 | 0 | 0 | 0 | 0 | 0 | 1 |
| 0 A | 1 | 1 | 0 | 0 | 0 | 1 | 1 | 0 | 0 | 0 | 0 |
| 0 B | 1 | 1 | 0 | 0 | 0 | 1 | 0 | 1 | 0 | 0 | 0 |
| . | | | | | . | . | . | | | | |
| 5 A | 1 | 0 | 0 | 0 | 0 | 0 | 1 | 1 | 1 | 0 | 0 |
| 5 B | 1 | 0 | 0 | 0 | 0 | 0 | 1 | 1 | 0 | 1 | 0 |
| 5 C | 1 | 0 | 0 | 0 | 0 | 0 | 1 | 1 | 0 | 0 | 1 |
| 5 D | 1 | 0 | 0 | 0 | 0 | 0 | 1 | 0 | 1 | 1 | 0 |
| 5 E | 1 | 0 | 0 | 0 | 0 | 0 | 1 | 0 | 1 | 0 | 1 |
| 5 F | 0 | 1 | 1 | 1 | 0 | 0 | 1 | 0 | 0 | 0 | 0 |
| 6 0 | 0 | 1 | 1 | 1 | 0 | 0 | 0 | 1 | 0 | 0 | 0 |
| 6 1 | 0 | 1 | 1 | 1 | 0 | 0 | 0 | 0 | 1 | 0 | 0 |
| . | | | | | . | . | . | | | | |
| F A | 0 | 0 | 0 | 0 | 1 | 0 | 1 | 1 | 0 | 0 | 1 |
| F B | 0 | 0 | 0 | 0 | 1 | 0 | 1 | 0 | 1 | 1 | 0 |
| F C | 0 | 0 | 0 | 0 | 1 | 0 | 1 | 0 | 1 | 0 | 1 |
| F D | 0 | 0 | 0 | 0 | 0 | 1 | 1 | 1 | 0 | 1 | 0 |
| F E | 0 | 0 | 0 | 0 | 0 | 1 | 1 | 1 | 0 | 0 | 1 |
| F F | 0 | 0 | 0 | 0 | 0 | 1 | 1 | 0 | 1 | 0 | 1 |

The write pulses conforming to the encoded output of the encoder 33 are transmitted from the write pulse generator 35 to the laser driving circuit 24 which functions to drive the laser diode of the optical head 23 as a function of the encoded output, that is, the 4/11 demodulation code data. This causes the digital data $D_{IN}$ to be recorded in the form of the 4/11 demodulation code data on the data write regions $AR_D$ of the recording track TK being scanned on the optical disk D.

The laser driving circuit 24 is suitably controlled by the system controller 30, during the period for read-out or scanning of servo data on each control record region $AR_C$, to lower the level or intensity of the laser light from the laser diode of the optical head 23 to the playback level, and the earlier described recording operation is thereafter effected while the spindle servo circuit 21 and/or the head servo circuit 25 effect servo control on the basis of the servo data which had been read from the control record region $AR_C$.

The digital data recorded as the 4/11 modulation code data on the data write regions $AR_D$ on the recording track TK of the optical disk D are detected by the A/D converter 28 when the latter receives the playback output from the optical head 23 through the preamplifier 26. More specifically, as the playback output from the head 23 is sampled by the A/D converter 28 employing the channel clocks CK from the timing generator 27 as the operational timing clock signals, the four channel bits having signal levels higher than those of the other bits are adopted as the mark (logic "1") channel bits.

The 4/11 modulated code data detected by the A/D converter 28 is decoded into output digital data $D_{OUT}$ by a decoder 29 which performs a decoding operation corresponding to the encoding operation of the encoder 33 in the recording system. In other words, the format of the output digital data $D_{OUT}$ corresponds to that of the input data $D_{IN}$.

In the above described recording and/or reproducing apparatus, in the course of the recording operation, during which data writing on a data write region $AR_D$ of the optical disk D and servo data read-out from a control record region $AR_C$ are repeated alternately, the tracking data pits $Q_{H1}$, $Q_{H2}$ and the clock data pits $Q_{CK}$ are read out reliably from the second preformat region $AR_2$ which is spaced from the vicinity of the point where switching or change-over occurs from the write scanning of the data write region $AR_D$ to the read-out scanning of the control record region $AR_C$. Further, such reading of the tracking data pits $Q_{H1}$ and $Q_{H2}$ and the clock data pits $Q_{CK}$ is effected by means of a laser light beam which is in the stabilized focus servo state based on the focus data obtained from the focus servo region $AR_F$ at the downstream side of the control record region $AR_C$.

Moreover, the traverse data pits $Q_T$ may be reliably read from the first preformat region $AR_1$ on the basis of the playback clocks obtained from the clock data pits $Q_{CK}$ through application of the sampled servo to effect traverse counting of the recording tracks by track groups or units each consisting of four consecutive tracks.

It is to be noted that, since traverse counting is performed to determine the position of the recording track being scanned by the optical head in the playback mode, the traverse data pits $Q_T$ may be read reliably from the first preformat region $AR_1$ to effect such traverse counting, even if such first preformat region $AR_1$ were positioned at the upstream side of the control record region $AR_C$ adjacent to the data write region $AR_D$.

Moreover, in another embodiment of the invention shown on FIG. 5, paired traverse data pits $Q_{T1}$ and $Q_{T2}$ having the pit interval therebetween changed by one bit channel at intervals of two consecutive tracks are provided across six bit channels from the third to the eighth bit channels of the first preformat region $AR_1$ of the control record region $AR_C$ of each of the blocks $BL_1$ to $BL_{72}$. In such embodiment of the invention, traverse counting of the recording tracks may be performed by groups or units of tracks each consisting of two consecutive tracks.

Although illustrative embodiments of the invention have been described in detail herein with reference to the accompanying drawings, it will be understood that the invention is not limited to those precise embodiments, and that various changes and modifications may be effected therein by one skilled in the art without departing from the scope or spirit of the invention as defined in the appended claims.

What is claimed is:

1. A disk-shaped recording medium having an annular recording surface extending around a center aperture, and a large number of radially successive recording tracks surrounding said center aperture, each of said recording tracks including a predetermined number of recording regions, corresponding recording regions in said radially successive recording tracks, respectively, being in radial alignment with each other, each of said recording regions including a control record region and a data write region following said control record region;

each said control record region being divided into a first preformat region, a second preformat region and a focusing servo region;

said first preformat region being disposed at the upstream side of the respective control record region and having at least one traverse data pit arrayed on a centerline of the respective track, said traverse data pit being allotted for each of said tracks;

said second preformat region being disposed adjacent to said first preformat region and having a pair of tracking data pits spaced apart from each other by a predetermined distance in the direction along the respective track and arranged on radially inner and outer sides of said centerline, and a clock data pit arranged on said centerline; and said focusing servo region having a mirror-like surface and following said second preformat region.

2. The disk-shaped recording medium according to claim 1; wherein said clock data pit is arranged between said tracking data pits considered in the direction along said track centerline.

3. The disk-shaped recording medium according to claim 1; wherein said traverse data pit indicates traverse data by a grey code.

4. The disk-shaped recording medium according to claim 3; wherein each said first preformat region has paired traverse data pits indicating the traverse data by the grey code.

5. The disk-shaped reading medium according to claim 1; wherein said radially successive tracks are circular and concentric with said aperture.

6. The disk-shaped recording medium according to claim 1; wherein said radially successive tracks are constituted by successive turns of a spiral centered at said aperture.

7. An apparatus for recording and/or reproducing data on a disk-shaped recording medium having an annular recording surface extending around a center aperture, and a large number of radially successive recording tracks surrounding said center aperture, each of said recording tracks including a predetermined number of recording regions, corresponding recording regions in said radially successive recording tracks, respectively, being in radial alignment with each other, each of said recording regions including a control record region and a data write region following said control record region, each said control record region being divided into a first preformat region, a second preformat region and a focusing servo region, said first preformat region being disposed at the upstream side of the respective control record region and having at least one traverse data pit arrayed on a centerline of the respective track, said traverse data pit being allotted for each of the recording tracks, said second preformat region being disposed adjacent to said first preformat region and having a pair of tracking data pits spaced apart from each other a predetermined distance in the direction along the respective track and arranged on radially inner and outer sides of said centerline and a clock data pit arranged on said centerline, said focusing servo region having a mirror-like surface and following said second preformat region, said apparatus comprising:

head means optically scanning said recording tracks on said disk-shaped recording medium and providing a playback output, timing generating means for generating timing clocks on the basis of clock signals included in said playback output of said head means in response to said clock data pits, and head servo means for sampling said playback output of said head means by said timing clocks to detect focusing data from each said focusing servo region and tracking data indicated by said tracking data pits in each said second preformat region and applying a focusing servo signal and a tracking servo signal to said head means.

8. The apparatus according to claim 7; further comprising means sampling said playback output from said head means by said timing clocks to detect traverse data indicated by the traverse data pits on said first preformat regions and to effect traverse counting of aid recording tracks on the basis of the detected traverse data.

* * * * *